United States Patent
Susairaj et al.

(10) Patent No.: US 7,493,465 B2
(45) Date of Patent: Feb. 17, 2009

(54) METHOD AND SYSTEM FOR EXTENDED MEMORY WITH USER MODE INPUT/OUTPUT OPERATIONS

(75) Inventors: Margaret S. Susairaj, Sunnyvale, CA (US); Waleed Ojeil, San Francisco, CA (US); Peter Ogilvie, Redwood City, CA (US); Richard Frank, Naples, FL (US); Ravi Thammiah, Redwood Shores, CA (US)

(73) Assignee: Oracle International Corporation, Redwood Shores, CA (US)

( * ) Notice: Subject to any disclaimer, the term of this patent is extended or adjusted under 35 U.S.C. 154(b) by 237 days.

(21) Appl. No.: 10/848,103

(22) Filed: May 17, 2004

(65) Prior Publication Data

US 2005/0256976 A1 Nov. 17, 2005

(51) Int. Cl.
*G06F 12/00* (2006.01)
*G06F 12/06* (2006.01)
*G06F 21/00* (2006.01)
*G06F 9/26* (2006.01)
*G06F 9/34* (2006.01)

(52) U.S. Cl. .................. 711/203; 711/6; 711/202; 711/205; 711/206; 711/207; 711/221

(58) Field of Classification Search ............ 711/2, 711/200–221, 6
See application file for complete search history.

(56) References Cited

U.S. PATENT DOCUMENTS

| | | | | |
|---|---|---|---|---|
| 5,893,166 A * | 4/1999 | Frank et al. | | 711/163 |
| 5,956,754 A * | 9/1999 | Kimmel | | 711/206 |
| 6,125,430 A * | 9/2000 | Noel et al. | | 711/152 |
| 6,163,834 A * | 12/2000 | Garcia et al. | | 711/206 |
| 6,308,247 B1 * | 10/2001 | Ackerman et al. | | 711/206 |
| 6,947,970 B2 * | 9/2005 | Berry | | 709/212 |
| 7,055,152 B1 * | 5/2006 | Ganapathy | | 719/313 |
| 2004/0215918 A1 * | 10/2004 | Jacobs et al. | | 711/207 |

* cited by examiner

*Primary Examiner*—Sanjiv Shah
*Assistant Examiner*—Yaima Campos
(74) *Attorney, Agent, or Firm*—Townsend and Townsend and Crew LLP

(57) ABSTRACT

A computer system having a kernel for mapping virtual memory address space to physical memory address space. The computer system uses a method for performing an input/output operation. A physical memory buffer is registered with a subsystem, and the physical memory buffer is associated with a first virtual address, a size and a key. The physical memory buffer is dynamically associated with a second virtual address which is different from the first virtual address. As part of an application program an input/output operation is requested regarding the second virtual address. An application table is used to obtain the first virtual address, the key and the size. The first virtual address, the key and the size are supplied to the subsystem. The subsystem uses the first virtual address, the key and the size, to determine the physical memory buffer and performs an input/output operation using the physical memory buffer without intervention of the kernel.

22 Claims, 13 Drawing Sheets

150

| Physical Memory | Virtual Address |
|---|---|
| P1<br>P2<br>P3<br><br>*<br>*<br>*<br>* | VA1<br>VA2<br>VA3<br><br>*<br>*<br>*<br>* |

FIG. 1B
(Prior Art)

| Virtual Address | Buffer Key | Size | Physical Memory |
|---|---|---|---|
| VA1 | K1 | S1 | P1 |
| VA1 | K2 | S2 | P2 |
| VA2 | K2 | S3 | P2 |
| VA2 | K3 | S4 | P3 |
| * | * | * | * |
| * | * | * | * |
| * | * | * | * |

| Offset | Virtual Address | Key | Size |
|---|---|---|---|
| 0-1000 | VA1 | K1 | 1000 |
| 1001-2000 | VA2 | K2 | 1000 |
| 2001-3000 | VA2 | K3 | 1000 |

442 — Offset
444 — Virtual Address
446 — Key
448 — Size

Figure 4C

| Physical Address | Virtual Address | Key | Size |
|---|---|---|---|
| PA1 | VA1 | K1 | 1000 |
| PA2 | VA2 | K2 | 1000 |
| PA3 | VA2 | K3 | 1000 |

450

452 — Physical Address
454 — Virtual Address
456 — Key
458 — Size

Figure 4D

METHOD AND SYSTEM FOR EXTENDED MEMORY WITH USER MODE INPUT/OUTPUT OPERATIONS

TECHNICAL FIELD

The present invention relates generally to computer system components and processes that support data input and output operations. In particular, embodiments of the present invention relate to the use of extended memory and user mode input and output components and processes to support input and output operations.

BACKGROUND ART

FIG. 1A shows components of an Oracle™ input and output (I/O) infrastructure. In the system shown in FIG. 1A, data may need to be copied over multiple times before it reaches its final destination during the performance of an I/O operation. Moreover, the operating system (O/S) kernel may need to be accessed in order that an I/O operation may be performed. In the system shown in FIG. 1A, to perform an I/O operation, an I/O application 101 communicates its I/O request to an ODM library 105 via an ODM API 103, the ODM library 105 in turn transmits the request to the O/S kernel 107 through an ODM interface or API 108. The O/S kernel 107 facilitates the access of the physical memory unit 111 via ODM driver 109 and may involve address translations. Physical memory accesses that involve the O/S kernel 107 exact a significant cost in time and processor usage that may be saved if such accesses may be avoided and/or reduced.

Computer data input and output (I/O) systems, such as that shown in FIG. 1A, facilitate the transfer of data to and from data storage units of computer systems. The performance of a computer systems data I/O system is directly related to the accessibility of the data that is located in the computer system's data storage units. Where data is readily available the speed of I/O operations may be significantly increased. Consequently, schemes for increasing the accessibility of stored data are of particular interest to computer system and software designers.

Buffer cache memory is volatile memory that may be accessed more quickly than data stored in disk. Data that is stored in cache memory is generally stored in data blocks. Input and output applications may initially search buffer cache memory for data before searching disk, e.g., slower, memory. If the data sought is found, then a more time consuming search of disk memory for the desired data may be avoided.

The performance of a database is related to the size of its buffer cache. The larger the buffer cache, the larger the number of data blocks that may be kept in main memory. Because of the increased number of data blocks that are available in main memory, the number of trips required to be taken to the slower disk subsystem or remote nodes may be reduced.

Virtual memory is a component of some conventional operating systems. The operating system moves data back and forth between non-volatile data storage units and volatile storage units of the computer to accommodate the memory demands of applications running on the computer.

The utilization of virtual memory increases the accessibility of stored data by allowing programmers to use a very large range of memory or storage addresses for stored data. Using such schemes frees a programmer from having to be concerned about the availability of memory space. The computing system maps the programmers virtual addresses to real hardware storage addresses (physical addresses) and stores them in a mapping table. Mapping translations that are stored in the mapping table may be accessed by I/O applications requesting the information represented by the entries listed therein. FIG. 1B shows a mapping table 150 such as may be employed to store the virtual address 153 to physical memory 151 address translations. As is shown in FIG. 1B, a virtual address 153 is mapped to an associated physical memory address 151.

Generally, operating systems support more virtual memory space than physical memory space. Computer systems built on X86 processors by Intel™ support more physical memory than may be addressed by the virtual space supported by the processor. It should be appreciated that in such systems, even though the hardware can support more physical memory, the amount of virtual address space available from the OS kernel is limited. Oracle's™ Extended Memory feature allows the extra physical memory that is supported to be exploited by mapping the buffer cache portion of the shared global area (SGA) into a small virtual window and by mapping and unmapping datablocks on demand. Using such a process a physical buffer may be mapped multiple times to different virtual addresses during the lifetime of a process.

Another way I/O operations may be improved is to allow input and output requests to be executed at the level of a network interface card (NIC). "User mode" I/O is a feature available in Oracle™ release that employs this concept. FIG. 2 illustrates the operation of the user mode I/O feature. In the system shown in FIG. 2, the I/O application 101 transmits an I/O request to an Oracle Disk Manager (ODM) library 103, and the ODM library 103 facilitates the access of the physical memory unit 111 via NIC 115. Since the physical memory access avoids involvement of the O/S kernel 107, a significant cost in time and processor usage may be saved. It should be appreciated that an Ethernet interface 117 (e.g., which may include a Direct Access File System and a Direct Access Provider Library DAPL) may be situated between the ODM library 103 and the NIC 115 to facilitate communication there between (117 includes an ODM driver).

As a part of the "user mode" I/O approach, input and output buffers may be registered with the NIC driver before they are used as described above. Once the buffers are registered with the NIC driver subsequent inputs and outputs from that buffer may be performed as a remote direct memory access (RDMA) operation at the level of the NIC without having to involve the OS kernel. This improves database performance due to a reduction in the OS kernel/code path and host central processing unit (CPU) usage.

However, taking full advantage of the data accessibility provided by both "extended memory" and "user mode" I/O presents serious challenges. This is because the advantages of these schemes may be lost due to the necessity of re-registering data buffers as a result of the limited amount of virtual address space that is available (because dynamic memory re-mapping is performed in X86 architectures). It should be appreciated that the number of buffers that reside in physical memory may be much larger than the number of buffers that can fit within a virtual memory window in the X86 architecture. Consequently, in order to accommodate all of the buffers that reside in physical memory the available virtual addresses may need to be dynamically used more than once.

The aforementioned user mode I/O process requires that the system explicitly map a virtual address to a corresponding physical buffer whenever the physical buffers contents are accessible, and that it subsequently unmap the virtual address from the physical buffer when the physical buffers contents become inaccessible. It should be appreciated that assigning a buffer to a new virtual address requires a re-registration in the NIC driver. The re-registration with the NIC driver involves a kernel context switch (e.g., a switch from the execution of one process on the CPU to another). It should be appreciated that an operating system kernel context switch involves an accessing of the operating system so that the benefits of user mode I/O may be eliminated and or significantly reduced in an environment that allows physical memory to virtual memory dynamic remapping, such as an X86 architecture.

SUMMARY OF THE INVENTION

Accordingly, a need exists for a method and system which takes advantage of the data accessibility provided by "extended memory" and "user mode" input and output (I/O) systems. Embodiments of the present invention provide a method and system which accomplishes the above mentioned need within a computer system architecture that supports larger physical address space than the amount of virtual address space available in the operating system (OS) kernel.

For instance, one embodiment of the present invention employs both user mode I/O and extended memory capabilities in order to optimize I/O operations. According to one embodiment, a unique key that is associated with a physical memory buffer may be used as a means of identifying a physical memory buffer despite changes in the associated virtual address, e.g., resulting from dynamic re-mapping of the virtual address of the application buffer. A mapping translation between the key and the physical memory buffer is maintained and is used to identify the correct entry in a translation and protection table (TPT) of a network interface card (NIC). The NIC performs memory I/O operations in an efficient manner, e.g., without kernel involvement. This approach to mapping eliminates the need to reregister the buffer when its virtual address mapping is changed and allows a physical memory buffer and its contents to be accessed directly from an NIC without involving the operating system kernel (once registration is complete).

In one embodiment, a host to host transfer may be performed whereby contents of physical memory buffers that are registered with a local NIC and that are associated with offsets with respect to the I/O application (e.g., numerically identified ranges of memory addresses) that identify their positions in the buffer cache may be copied from memory units of a computing system associated with that NIC to the memory units of a computing system associated with a remote NIC. This allows an RDMA request to be issued from user space to the local NIC and over the network to a remote NIC without requiring any involvement of the central processing unit (CPU) of either system.

In one embodiment, buffer registrations may be optimized so as to reduce the number of operating system kernel calls that are necessary to be executed in order to accommodate a process. Using this approach large portions of the physical memory buffer cache may be registered and associated with location offsets during a single kernel call as a means of reducing operating system kernel calls.

In one embodiment, a computer system having a kernel for mapping virtual memory address space to physical memory address space is provided. The computer system uses a method for performing an input/output operation. A physical memory buffer is registered with a subsystem, and the physical memory buffer is associated with a first virtual address space and a key. An application program initiates the registration which places an entry in a NIC card identifying the physical address of the buffer, its first virtual address, the key and the buffer size. The physical memory buffer is dynamically associated with a second virtual address space which is different from the first virtual address space. As a part of the application program, an input/output operation is commanded regarding the second virtual address space. An identifier of the second virtual address space and an offset and size are supplied to a lookup table which provides an original virtual address and a key. The subsystem receives the original virtual address and the key. The subsystem uses the key to determine the associated physical memory buffer and performs the input/output operation using the associated physical memory buffer. Advantageously, the input/output operation is performed without intervention of the kernel, despite the dynamic remapping of the buffer to the second virtual address space.

In yet another embodiment, a computer system having virtual memory address space and physical memory address space is provided. The computer system includes an application program for initiating the registering of a physical memory buffer with a subsystem. The physical memory buffer is associated with a first virtual address space and a key and a buffer size as a result of the registering. The computer system includes an operating system kernel for dynamically associating the physical memory buffer with a second virtual address space which is different from the first virtual address space. An input/output operation, involving a host to host data transfer is commanded regarding the second virtual address space. An application program supplies an identifier of the second virtual address space and an offset and a size which is translated into an original virtual address, a key and a size. The subsystem uses the key and the original virtual address and the size to determine the physical memory buffer associated with the I/O operation. The physical memory buffer is used for performing the input/output operation. The input/output operation is performed without intervention of the kernel.

These and other advantages of the present invention will no doubt become obvious to those of ordinary skill in the art after having read the following detailed description of the preferred embodiments which are illustrated in the drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

FIG. 1B shows a mapping table such as may be employed to store the virtual to physical address translations.

FIG. 3C shows a network interface card (NIC) driver translation and protection table (TPT) including data categories and contents according to one embodiment of the present invention.

FIG. 4C shows a internal mapping table including data categories and contents for the FIG. 4B embodiment according to one embodiment of the present invention.

FIG. 4D shows a NIC mapping table including data categories and contents for the FIG. 4B embodiment according to one embodiment of the present invention.

DETAILED DESCRIPTION OF THE INVENTION

Reference will now be made in detail to embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, the present invention may be practiced without these specific details. In other instances, well known methods, procedures, components, and circuits have not been described in detail as not to unnecessarily obscure aspects of the present invention.

Figure 1A:
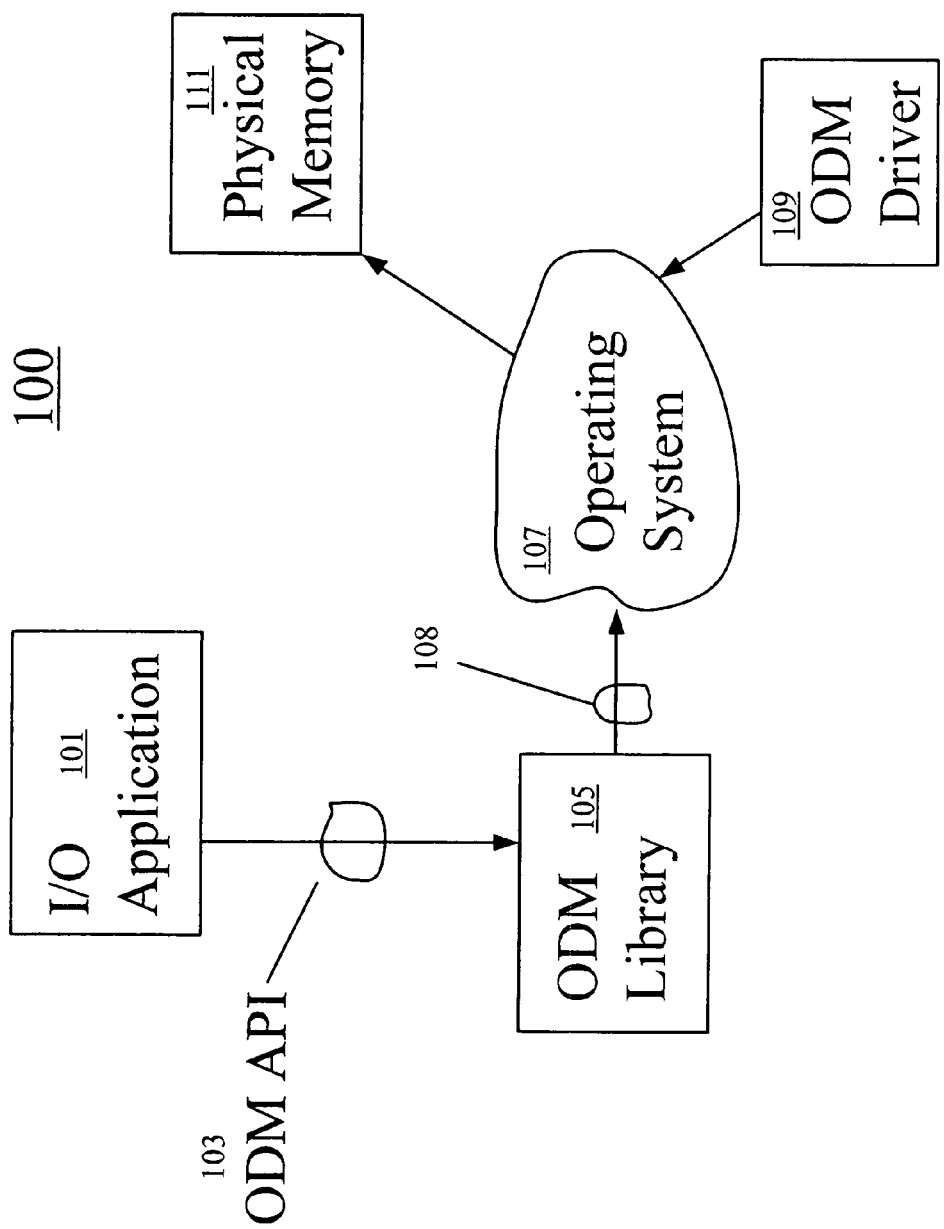
FIG. 1A shows components of an exemplary input and output (I/O) system of the prior art.
Figure 2:
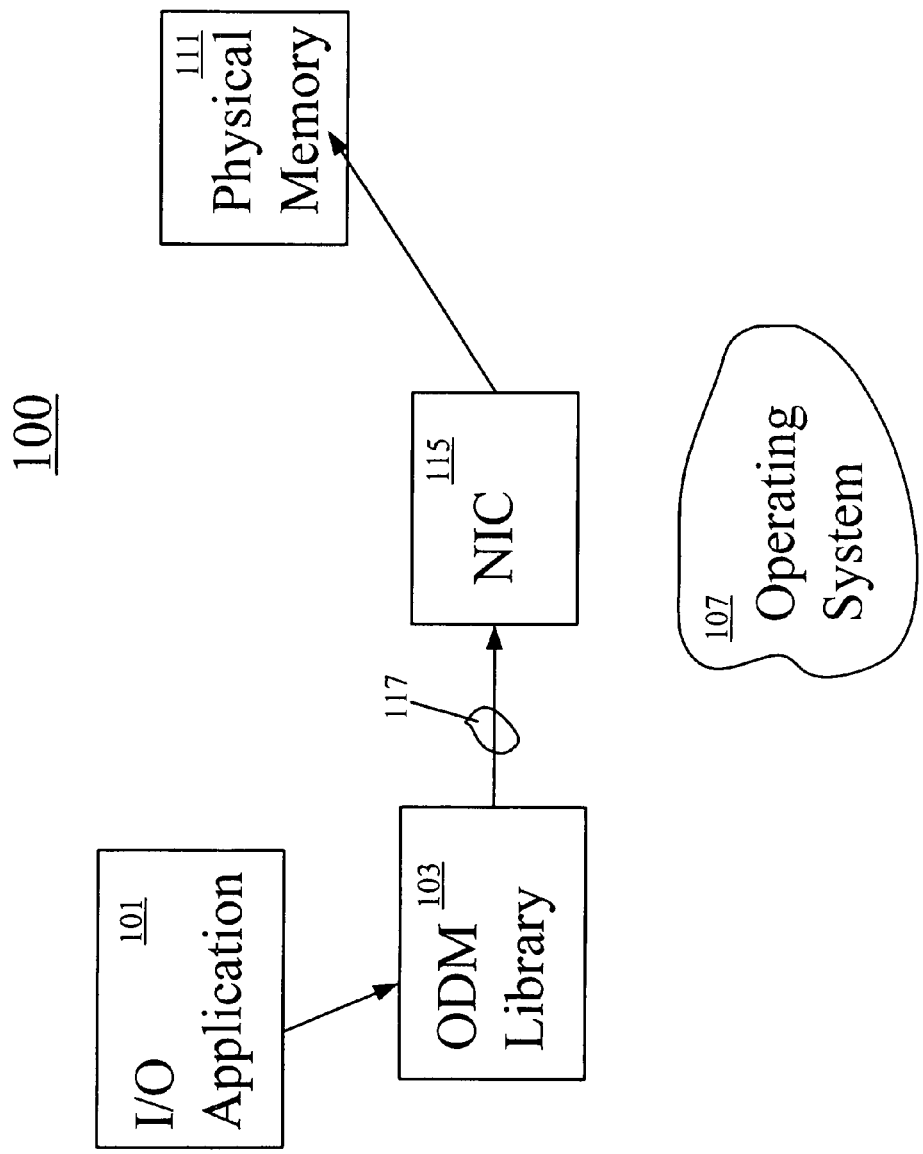
FIG. 2 illustrates the operation of an exemplary user mode I/O feature.
Figure 3A:
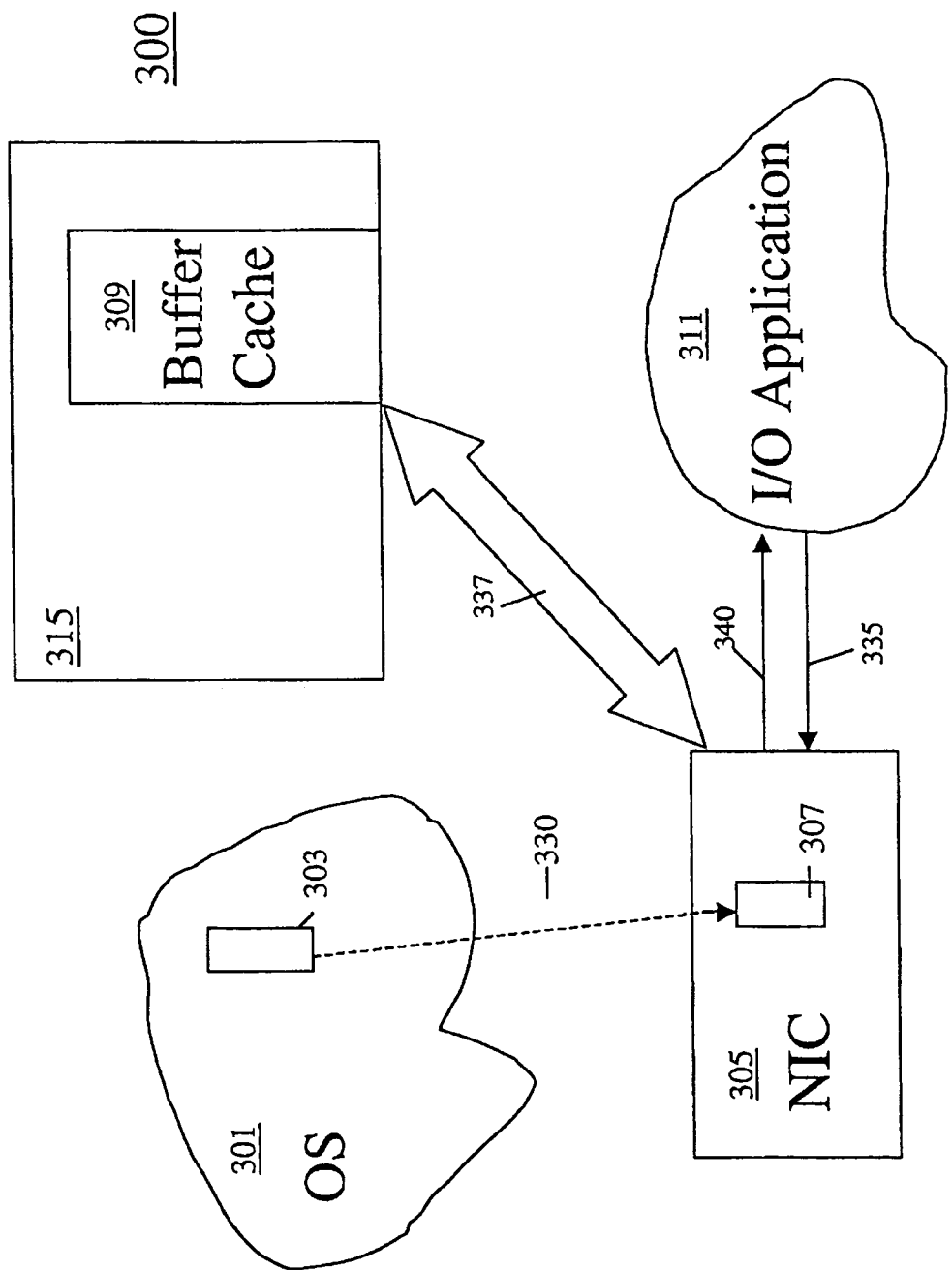
FIG. 3A shows components of a computer system I/O architecture that employs user mode I/O and extended memory according to one embodiment of the present invention.

Exemplary Extended Memory and User Mode I/O System in Accordance with Embodiments of the Present Invention FIG. 3A shows components of a computer system input/output (I/O) infrastructure 300 that employs user mode I/O and extended memory to support I/O operations according to one embodiment of the present invention.

Embodiments of the present invention employ both user mode I/O and extended memory (e.g., VLM or very large memory) capabilities in order to optimize I/O operations. In accordance with extended memory modes, the virtual address space of an operating system may be dynamically remapped over various portions of a larger sized physical address space, e.g., X86 microprocessor architecture. According to one embodiment, a unique key that is associated with a physical memory buffer may be used as a means of identifying a physical memory buffer despite changes in a virtual address associated with the physical memory buffer. A mapping translation between the key and the physical memory buffer is maintained, by a subsystem and is used to identify the correct entry in a translation and protection table (TPT) (e.g., 307) of the subsystem, e.g., a network interface card (NIC) (e.g., 305). This approach to mapping eliminates the need to reregister the buffer when its virtual address mapping is changed and allows a physical memory buffer and its contents to be accessed directly from an NIC (e.g., 305) for I/O operations without involving the operating system kernel. FIG. 3A shows operating system 301, operating system page table (PT) 303, NIC driver 305, NIC driver TPT 307, buffer cache 309 and I/O application 311. The physical address space 315 may be 36-bit addressable in one embodiment.

Operating system (OS) 301 e.g., 32-bit address space, executes a registration of each extended cache physical memory buffer with the NIC driver 305 e.g., at startup or by request for an application program. According to one embodiment, a physical memory buffer key is determined at registration with original virtual address and size to uniquely identify each physical memory buffer with respect to the NIC card driver. The key may be a function of the physical address or offset, of the buffer, e.g., a hash. As mentioned above, the mapping translations between physical memory buffers, virtual addresses and the physical memory buffer keys are registered in the table 307 of the NIC 305 and are maintained by the NIC 305 so that they may be used during I/O operations to obtain a correct registration entry in a TPT of the NIC driver (e.g., 307). It should be appreciated that this approach eliminates the need to reregister a physical memory buffer when its virtual address is changed due to dynamic re-mapping to accommodate the larger sized physical memory space 315, e.g., 36-bit versus 32-bit.

Operating system PT 303 stores a mapping between the virtual address and the physical memory associated with it. According to one embodiment, the PT 303 provides translations that are registered with the NIC that are involved in identifying a physical memory buffer targeted in an I/O operation. According to one embodiment, the contents of operating system PT 303 are registered (e.g., copied to) with the NIC 305 to create an NIC TPT 307 during initial operations and both tables are updated for each new buffer registration thereof.

NIC driver 305 provides a network interface and a platform for I/O access to physical memory buffers. It should be appreciated that at startup contents of the operating system (O/S) PT 303 which are associated with buffer cache 309 are registered with (e.g., copied to) memory units of the NIC driver 305. According to one embodiment, the PT 303 provides the virtual address to physical memory buffer translations involved in identifying a physical memory buffer selected for an I/O operation upon registration of a physical memory buffer in the table, the kernel provides the proper physical address for the corresponding virtual address. It should be appreciated that the O/S PT 303 data that is copied from the operating system and that is registered with the NIC 305 populate an NIC driver TPT 307 along with unique physical memory buffer keys that are generated. The NIC driver TPT 307 allows the NIC 305 to identify the physical memory buffers that correspond to given physical memory buffer keys.

Application 311 issues input and output requests to a NIC driver 305. These requests may be issued as a part of either internal or external computer system processes that are managed by the application. The requests may be issued as remote direct memory access (RDMA) requests in one example and importantly do not involve the O/S kernel. This approach enhances computer system performance as O/S kernel code path and host central processing unit (CPU) usage is reduced.

Buffer cache 309 maintains the cache of physical memory buffers that are available to be mapped. Individual physical memory buffers that are a part of the buffer cache 309 (and that contain blocks of data) are assigned a virtual address when mapped by the I/O application. When the buffer is registered, the NIC assigns a unique key to the physical memory buffer. These assignments are used to populate an NIC TPT 307 along with original virtual address and buffer size during registration and are stored with the NIC driver 305. In alternate embodiments other means of maintaining this data may be employed.

It should be appreciated that according to one embodiment of the present invention, at start up or at any time an application wants to register a physical buffer, a registration process is executed that entails: (1) mapping data block portions of the buffer cache into a virtual memory window and assigning virtual addresses (performed by the kernel in one embodiment), (2) registering the virtual address and size with NIC which assigns a unique key value to this buffer; (3) storing the key, the virtual address and size in the NIC TPT; (4) storing the original virtual address, size offset and key in a table located within the application process. In FIG. 3A, the dashed arrow 330 (dashed as an indication of its occurrence as a part of the registration process) represents the registration (e.g., copying, transmission etc.) of virtual address mapping to physical address, key assignment for the physical memory driver is done by the NIC driver. Referring to FIG. 3A, solid arrow 335 represents an I/O request that may be issued from application 311, double headed arrow 337 represents the access and retrieval of information from the buffer cache, while solid arrow 340 represents data transmitted to I/O application 311 as a result of an I/O request. According to one embodiment, once mapped physical memory buffers have been registered with the NIC driver 305, the operating system kernel (e.g., 301) may not thereafter be involved in I/O operations. Future I/Os that involve registered physical memory buffers may be performed as a remote RDMA without involving the operating system kernel (e.g., 301) in one example.

Figure 3B:
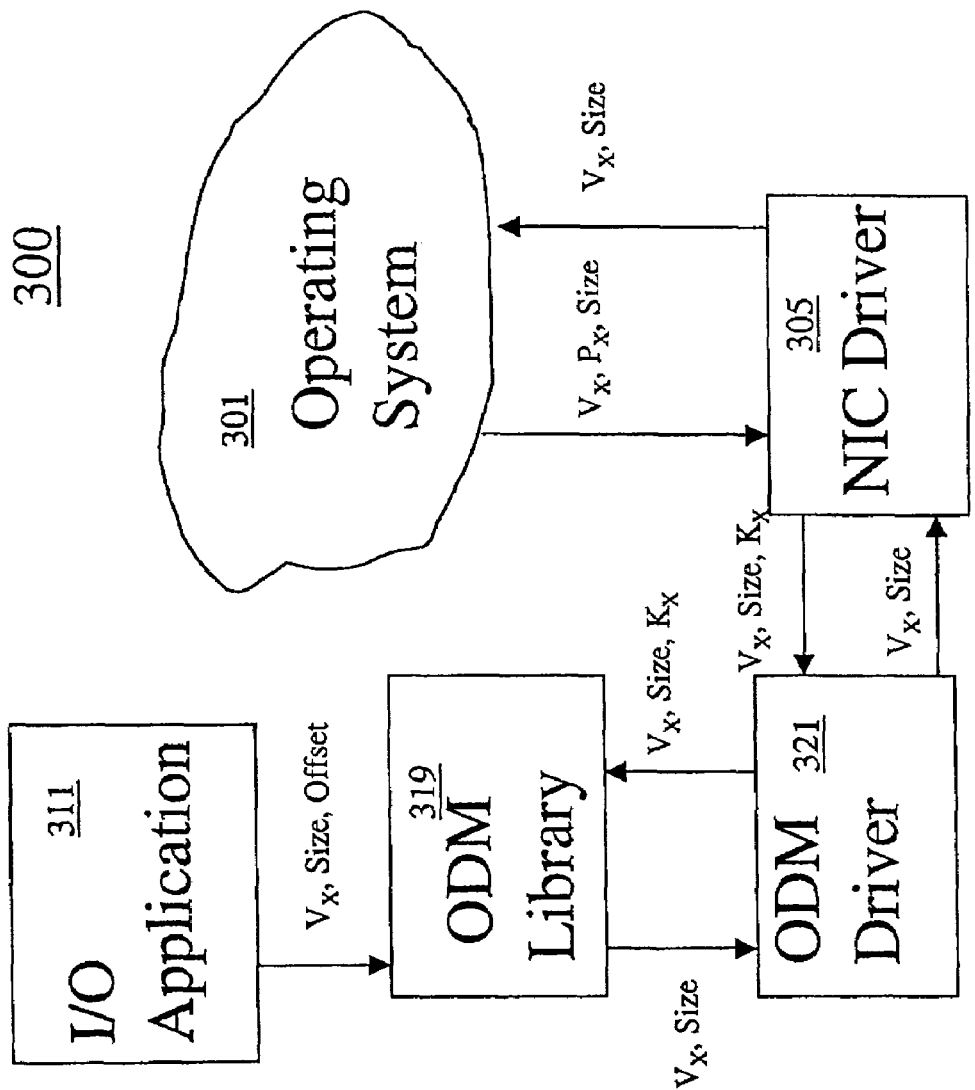
FIG. 3B illustrates data flow and operations performed in an exemplary registration process according to one embodiment of the present invention.

FIG. 3B illustrates operations performed in an exemplary registration process 300 according to one embodiment of the present invention. In the embodiment shown in FIG. 3B, Oracle™ communication interfaces (e.g., ODM driver 321, ODM library 319) are shown as exemplary separate elements that mediate communications between the application 311, the O/S kernel 301 and the NIC driver 305. However, in alternate embodiments, the functionality that is provided by these components may be provided as a part of other basic I/O infrastructure functionality such as is provided by the application 311, the O/S kernel 301 and the NIC 305. This registration process may be performed at startup and/or at any time an application establishes a buffer.

Referring to FIG. 3B, in an exemplary registration process, the application 311 supplies the known virtual address $V_x$, size and offset of a physical memory buffer to the ODM library 319, which then communicates the virtual address and size to the ODM driver 321 (the offset remains in the ODM library). The ODM driver 321 in turn supplies the virtual address $V_x$ and size to NIC driver 305. The NIC driver supplies the virtual address $V_x$ and size to the O/S kernel 301. The O/S system kernel 301 supplies the virtual address $V_x$, physical memory buffer $P_x$ and size to the NIC driver 305. The NIC driver 305 then generates a physical memory buffer key $K_x$ that is associated with the physical memory buffer $P_x$ of the buffer cache.

The key may be a hash of the physical buffer address and is unique to the assigned buffer. The translations for the physical memory buffer $P_x$, physical memory buffer key $K_x$, size and virtual memory address $V_x$ are then used to populate a TPT associated with the NIC driver 305 (see FIG. 3C and the accompanying discussion below). The NIC driver supplies the virtual address $V_x$, size and key $K_x$ to the ODM driver 321 which in turn supplies the virtual address $V_x$, size, and key $K_x$ to the ODM Library 319.

Once the information is registered with the NIC driver 305, future I/O request may be directed to the NIC driver 305 without kernel involvement. It should be appreciated that when a physical memory buffer $P_x$ is reassigned to a new virtual address (e.g., discussed below as VA2 in FIG. 3D), and the I/O application makes a request (with the associated key) for the physical memory buffer then associated with the new virtual address, the NIC may use the unique physical memory buffer key $K_x$ that is associated with the physical memory buffer to identify the correct buffer.

FIG. 3C shows exemplary memory resident NIC driver TPT 320 data categories and contents according to one embodiment of the present invention. The NIC driver TPT 320 includes data categories for physical memory buffer 323, virtual memory address 325, physical memory buffer key 327 and size 329. The NIC driver TPT 320 contains mapping translations that associate a physical memory buffer 323 with a physical memory buffer key 327, a virtual memory address 325 and a size 329. The mapping translation for a physical memory buffer 323 and an associated physical memory buffer key 327 may remain the same throughout a process cycle.

Figure 3D:
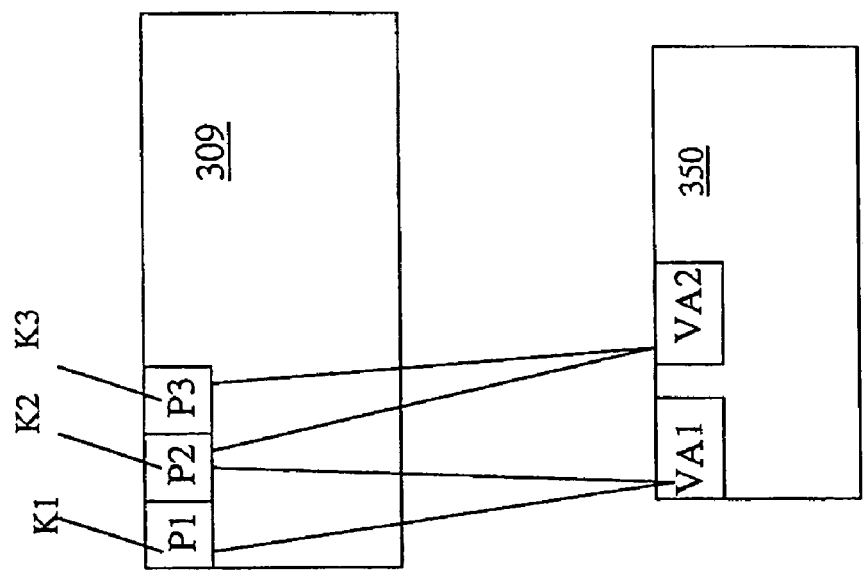
FIG. 3D illustrates the dual assignment mapping characteristic of the extended memory approach according to one embodiment of the present invention.

However, the mapping translation for a physical memory buffer 323 and an associated virtual address 325 may change during a process cycle as is shown in FIG. 3D.

FIG. 3D illustrates a mapping characteristic of an exemplary extended memory/user I/O system according to one embodiment of the present invention. FIG. 3D shows virtual memory window 350, buffer cache 309 and physical memory buffer keys K1-K3. Shown as a subpart of virtual memory window 350 is virtual memory addresses VA1 and VA2. Shown as a subpart of buffer cache 309 is physical memory buffers P1, P2 and P3. According to one embodiment, because the address space provided by virtual memory window 350 may be smaller (e.g., 32-bit) than the space required to accommodate the physical memory buffers (e.g., P1-P3, etc.) contained in the buffer cache 309 (e.g., 36-bit) that are available to be mapped, a virtual memory address may be mapped to a plurality of portions of the physical memory buffers (as was discussed with reference to FIG. 3A) in order to assign fully the physical memory buffers (e.g., P1-P3, etc.) contained in the buffer cache 309. For example, in FIG. 3B, virtual memory location VA1 may be mapped to physical memory buffers P1 and P2, while virtual memory location VA2 may be mapped to physical memory buffers P2 and P3 during a process cycle.

Virtual memory window 350 contains the set of virtual memory addresses (e.g., available virtual memory addresses, $V_x$ in FIG. 3B) that may be provided by the operating system (e.g., 301). The virtual memory addresses allow the accessing of large ranges of physical memory addresses for data I/O operations. Although mapping the full range of physical memory that may be accommodated with virtual memory may involve the association of each virtual memory address with a plurality of physical memory buffers (e.g., P1 and P2) during a process cycle, it should be noted that each physical memory buffer key (e.g., K1) may be associated with a single physical memory buffer (e.g., P1) during a process cycle.

Advantages provided by embodiments of the present invention include the avoidance of multiple registrations of physical memory buffers with network interface card (NIC) 305 in support of I/O operations. The use of the extended cache facility (e.g., very large memory or VLM) as described herein (e.g., using key identification of physical memory buffers) allows the extraction of the full benefit of user mode I/O schemes. The utilization of a physical memory buffer key to identify a physical memory buffer may be distinguished from conventional approaches where the current virtual address associated with a physical memory buffer is relied upon as well as static memory mapping to identify a physical memory buffer (e.g., P1-P3 etc.).

It should be appreciated that in conventional systems, where the current virtual address (e.g., VA1, VA2 etc.) associated with a physical memory buffer (e.g., P1-P3 etc.) is relied upon with virtual address and size to identify the physical memory buffer, a context switch is necessary when the physical memory buffer assignment needs to be changed to correspond to a new available virtual address. By contrast, according to exemplary embodiments of the present invention, a unique and static key is used along with virtual address and size to identify each of the physical memory buffers (e.g., P1-P3 etc.) that are registered with the NIC driver 305. Thus, the step of reregistering the extended cache buffers when their initially assigned virtual address is no longer available may be avoided.

Moreover, a reduction in the number of registration calls made to the NIC driver may be realized by registering unusually large areas of extended cache in a single call. By using such an approach, embodiments of the present invention show a significant improvement in I/O processing and latency time over conventional systems. The decrease in I/O processing time frees up central processing unit (CPU) resources which may be beneficial for systems running compute intensive applications.

Figure 4A:
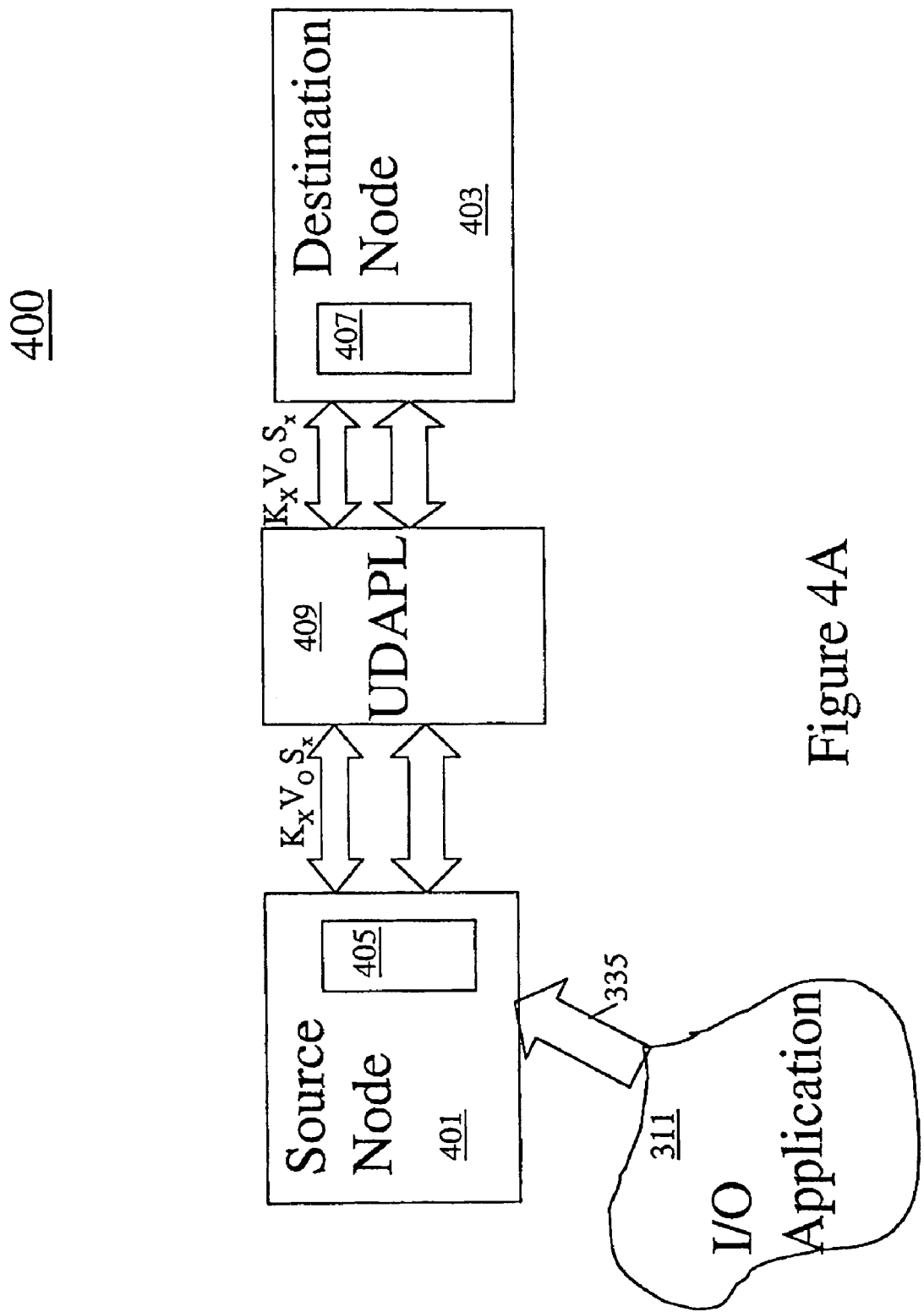
FIG. 4A illustrates an application of user mode I/O and extended memory using remote direct memory access (RDMA) according to one embodiment of the present invention.

FIG. 4A illustrates an exemplary host to host application of user mode I/O and extended memory using remote direct memory access (RDMA) according to one embodiment of the present invention. RDMA is a NIC feature that allows one computer to directly place information into the memory of another computer. Contents of physical memory buffers that are registered with a local NIC and that are associated with offsets (e.g., numerically identified ranges of memory addresses) that identify their positions in the buffer cache may be copied from memory units of a computing system associated with that NIC to the memory units of a computing system associated with a remote NIC. This allows an RDMA request to be issued from user space to the local NIC and over the network to a remote NIC without requiring any involvement of the kernel of either system.

FIG. 4A shows I/O application 311, source node 401, destination node 403, source node memory 405, destination node memory 407 and direct access provider library (UDAPL) 409.

According to one embodiment of the present invention, an RDMA request may be issued from an NIC (e.g., 305) located at source node 401 to an NIC located at destination node 403 or vice versa. According to such embodiments, using the processes described herein, an NIC (e.g., 305) located at the source and destination nodes (e.g., 401 and 403) may facilitate the transfer of data to or from physical memory (e.g., 309 etc.) without the involvement of the operating system kernel (e.g., 301 etc.) of the systems associated with each node. Thus, the number of context switches between kernel space and user space that may be involved in handling network traffic may be reduced.

According to one embodiment, a programming interface, such as a UDAPL 409 may be used to facilitate the transfer of data between NICs. UDAPL 409 enables applications to access network interface hardware without operating system intervention, and to carry out bulk data transfers directly between application buffers. UDAPL 409 enables the contents of physical memory buffers (e.g., 309) registered with one NIC to be accessed and copied (e.g., transferred) directly to a remote NIC. Consequently, an RDMA request may be issued from user space (e.g., an I/O application) to a local NIC (e.g., 401, 403) and over the network to a remote NIC (e.g., 401, 403) without requiring OS kernel (e.g., 301) involvement. In alternate embodiments, other programming interfaces may or may not be used as a means of facilitating the transfer of data between NICs.

According to one embodiment, when an RDMA transfer to a remote node is executed, the offset value of the buffer is used as an index to the lookup table of the application program which provides the original virtual address, size and corresponding key value. The offsets are used to identify the associated physical memory buffer keys and the original virtual addresses and size that are associated with particular physical memory buffers at startup.

Before the RDMA operation is executed, the source node and the destination node ships a handle identifying the remote buffers (e.g., communications). The handle facilitates the transfer of data from physical memory associated with the source node to physical memory associated with the destination node. The handle that is transmitted from the destination node identifies the memory location that will accommodate the transferred data in physical memory associated with the destination node. The handle that is transmitted from the destination node identifies where the data to be transferred is located in the physical memory associated with the source node. The transfer of handles may be performed after the registration of the physical memory cache of devices located at the source and destination nodes with their respective NICs.

Thereafter, a physical memory buffer key $K_X$ and an original virtual address $V_O$ and size may be presented to the UDAPL (see FIG. 4A). The UDAPL may identify the physical memory buffer $P_X$ associated with the physical memory buffer key $K_X$ and the original virtual address $V_O$ and size and effect a copying of the contents of the selected physical memory buffer $P_X$ to memory units associated with the remote node that were identified in the aforementioned exchange of handles. It should be appreciated that in addition to the software level operations executed by the UDAPL, hardware level operations (e.g., registrations, data swapping) executed by infini-band cards (not shown) located at both nodes accommodate the data transfers.

Figure 4B:
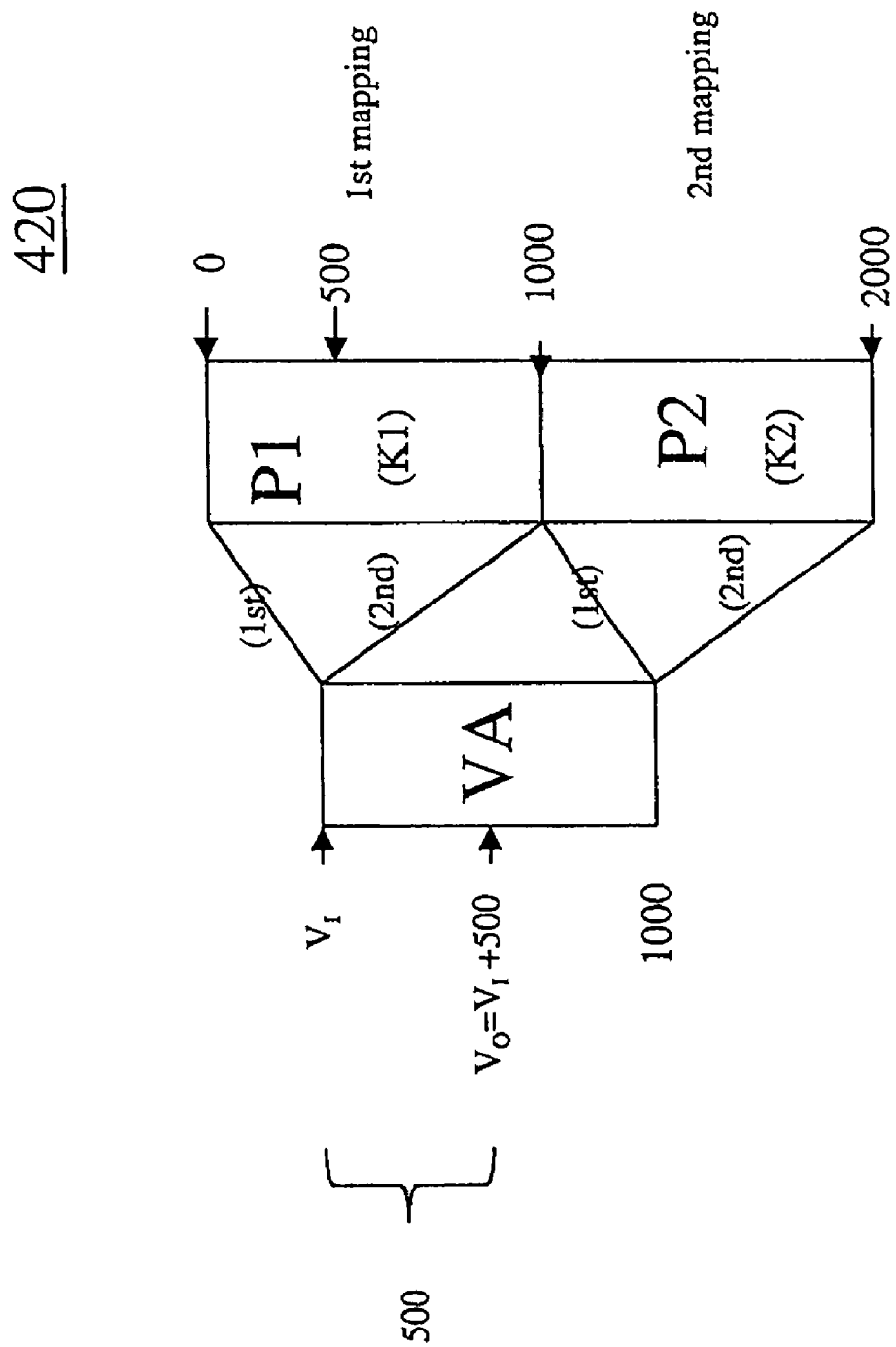
FIG. 4B illustrates an exemplary buffer registration scheme according to one embodiment of the present invention.

FIG. 4B illustrates an exemplary buffer registration scheme according to one embodiment of the present invention. Buffer registrations may be optimized so as to reduce the number of operating system kernel calls that are necessary to be executed in order to register an entire buffer cache. For example, an offset and a size may be associated with a range of physical memory buffers (illustrated in FIG. 4B by reference numbers P1 and P2 that are mapped to unique keys K1 and K2) during a registration process. In the FIG. 4B example, physical memory buffer cache P1 is associated with memory location offsets 0-1000, and physical memory buffer cache P2 is associated with physical memory location offsets 1001-2000. Using this approach large portions of the physical memory buffer cache may be registered and associated with location offsets during a single kernel call as a means of reducing operating system kernel calls.

According to one embodiment, individual physical memory buffers may be identified with the physical memory buffer key (e.g., K1, K2, etc.) and virtual address and size. For example, to identify the physical memory buffer that is located at location offset 500 in buffer cache P1, a physical memory buffer key (e.g., K1) that corresponds to the buffer cache P1 (that contains offset location 500) may be generated at startup and may be registered with the NIC (e.g., 305). According to one embodiment this information may be used to locate individual physical memory buffers located within a cache of buffers that are registered with the NIC (e.g., 305).

According to one embodiment, the original virtual addresses $V_O$ mapped to the individual buffers located in a physical memory buffer cache may be ascertained by adding the offset magnitude that corresponds to the offset positions of the individual buffers within the physical memory buffer cache to a virtual address offset magnitude that corresponds to an initial virtual address $V_I$, position. For example for a physical memory buffer with an offset magnitude of 500 within physical memory buffer cache P1 (see FIG. 4B) the original virtual address associated therewith may be given by the equation:

$$V_O = 500 + V_I$$

This is because according to one embodiment, there may be a one to one correspondence between virtual addresses and physical memory buffers of portions of the buffer cache in embodiments where offsets are employed. This applies if the buffer is within the scope of one registration, e.g., contained within one registration entry. Consequently, although a current virtual address associated with a physical memory buffer may be different from that which was initially assigned, the associated key (which identifies physical memory buffer), and the physical memory buffer location offset within the buffer cache, may be used to identify the location of the original virtual address $V_O$ within a set of virtual addresses.

As discussed above, with reference to FIG. 4A, once identified, the physical memory buffer key and the original virtual address may be presented to a UDAPL that is being used to facilitate communication and the transfer of data from one node to another. The UDAPL may identify the physical memory buffer $P_X$ associated with the physical memory buffer key $K_X$ and the original virtual address $V_O$ and effect a copying of the contents of the identified physical memory buffer to memory units of a remote node.

FIG. 4C illustrates an exemplary internal mapping table 440 e.g., within the application including data categories and contents for the FIG. 4B embodiment according to one embodiment of the present invention. The mapping table data categories shown in FIG. 4C include offset 442, virtual address 444, key 446 and size 448.

Mapping table 440 contains information that allows the identification of a specific physical memory buffer in a cache of buffers using offset data. The offset data 442 and size 448 contained in the table corresponds to buffer cache locations and may be used to identify portions of the buffer cache (e.g., P1, P2 etc.) that correspond to the locations of individual physical memory buffers (physical memory buffers and the blocks of data within memory).

Moreover, mapping table 440 contains mapping translations that associate offset data 442 with a physical memory buffer key 446 (e.g., K1, K2 etc.) and a virtual memory address (e.g., VA1, VA2 etc.). The mapping translation for offset data 442 and an associated physical memory buffer key 446 (e.g., K1, K2, etc.) may remain the same throughout a process cycle. The same virtual address may get reused for another offset data 442 as shown in the table 440.

FIG. 4D illustrates an exemplary NIC mapping table 450 including data categories and contents for the FIG. 4B embodiment according to one embodiment of the present invention. The mapping table data categories shown in FIG. 4D include physical address 452, virtual address 454, key 456 and size 458.

Mapping table 450 contains information that allows the identification of a specific physical memory buffer in a cache of buffers using virtual address key and size. Physical addresses 452 correspond to buffer cache locations and may be used to identify portions of the buffer cache (e.g., P1, P2 etc.) that correspond to the locations of individual physical memory buffers (physical memory buffers and the blocks of data contained therein).

Moreover, mapping table 450 contains mapping translations that associate a physical memory address 452 with a physical memory buffer key (e.g., K1, K2 etc.) and a virtual memory address (e.g., VA1, VA2 etc.). The mapping translation for a physical memory address 452 and an associated physical memory buffer key 456 (e.g., K1, K2, etc.) may remain the same throughout a process cycle. The same virtual address may get reused for another physical address as shown in the table 450.

Figure 5:
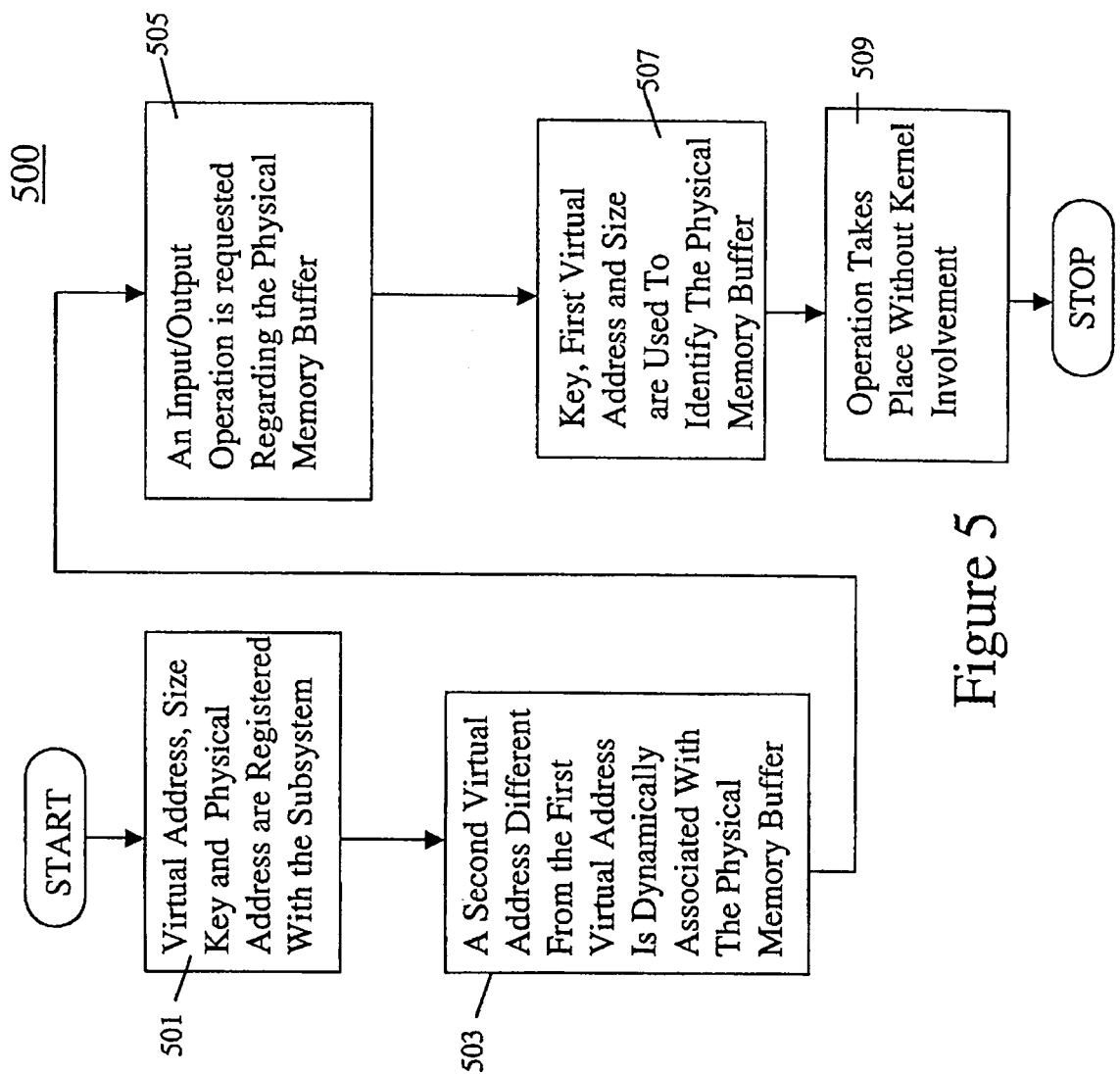
FIG. 5 is an exemplary flowchart of computer implemented steps for performing an I/O operation in accordance with one embodiment of the present invention.

Exemplary Extended Memory and User Mode I/O Operations in Accordance with Embodiments of the Present Invention FIG. 5 is a flowchart of steps performed in a computer implemented method for carrying out an input/output operation in accordance with one embodiment of the present invention. The method may be performed on a computer system that employs an operating system kernel to map virtual memory address space to physical memory address space. According to one embodiment this information may be subsequently registered with an NIC (e.g., 305). Assigning a key to a range of physical memory buffers (e.g., P1, P2 in FIGS. 3B and 3C) eliminates the need to reregister the buffer with the NIC (e.g., 305) when its virtual address mapping is changed and allows a physical memory buffer and its contents to be accessed directly from the NIC (e.g., 305) without involving the operating system kernel.

It should be appreciated that the flowchart of FIG. 5 includes processes of the present invention which, in one embodiment, are carried out by processors and electrical components under the control of computer readable and computer executable instructions. The computer readable and computer executable instructions reside, for example, in data storage features such as computer usable volatile memory and/or computer usable non-volatile memory (e.g. 604 and 606 described herein with reference to FIG. 6). However, the computer readable and computer executable instructions may reside in any type of computer readable medium. Although specific steps are disclosed in the flowcharts, such steps are exemplary. That is, the present invention is well suited to performing various other steps or variations of the steps recited in FIG. 5. Within the present embodiment, it should be appreciated that the steps of the flowcharts may be performed by software, by hardware or by any combination of software and hardware.

At step 501, a physical memory buffer is registered with a subsystem. The physical memory buffer is associated with a first virtual address, a size and a key. According to one embodiment, the subsystem that the physical memory buffer may be registered with is an NIC (e.g., 305).

At step 503, a second virtual address which is different from the first virtual address is dynamically associated with the physical memory buffer. According to one embodiment, the same virtual address may get reused for another physical memory buffer.

At step 505, an input/output operation is requested regarding the physical memory buffer as part of the application program. It should be appreciated that an application table is used to obtain the first virtual address, and the size which are supplied to the subsystem.

At step 507, the subsystem uses the first virtual address, the key, and the size to determine the physical memory buffer and performs the input/output operation using the physical memory buffer. It should be appreciated that the input/output operation may be performed without intervention of the operating system kernel.

Exemplary Hardware in Accordance with Embodiments of the Present Invention

Figure 6:
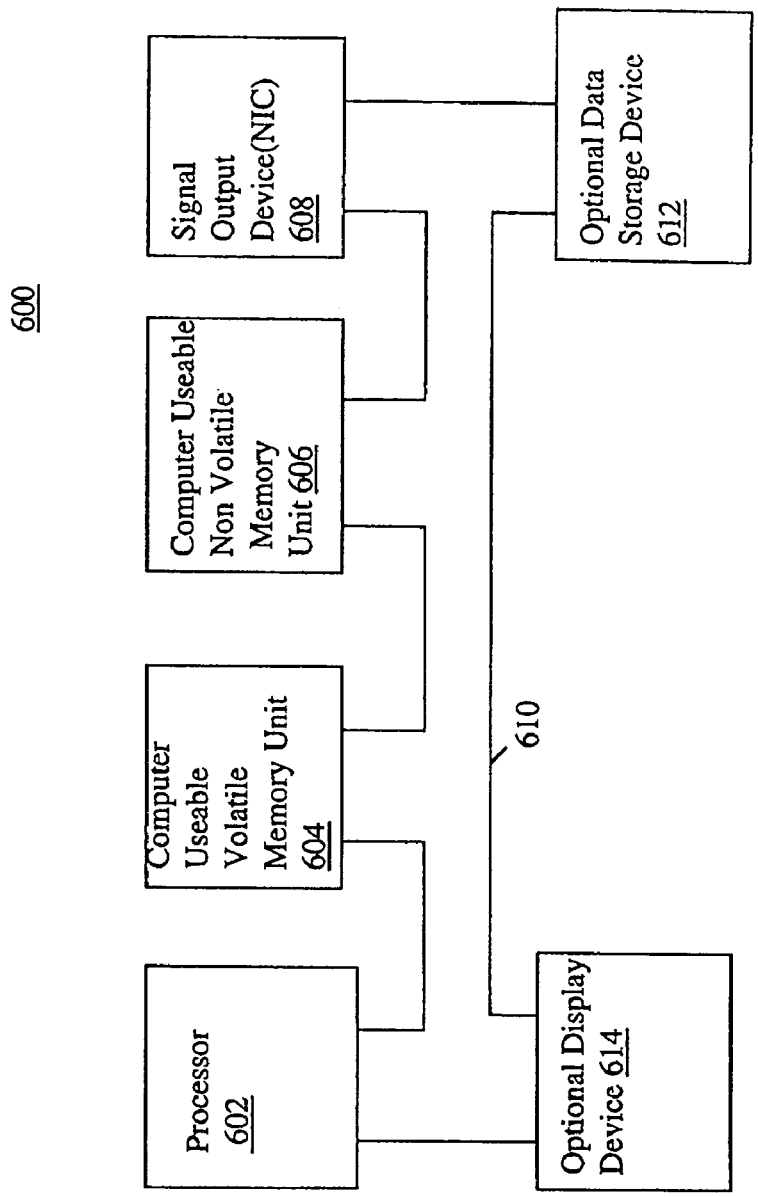
FIG. 6 is a block diagram of an embodiment of an exemplary computer system used in accordance with the present invention.

FIG. 6 is a block diagram of an embodiment of an exemplary computer system 600 used in accordance with the present invention. It should be appreciated that system 600 is not strictly limited to be a computer system. As such, system 600 of the present embodiment is well suited to be any type of computing device (e.g., server computer, portable computing device, embedded computer system, etc.). Within the following discussions of the present invention, certain processes and steps are discussed that are realized, in one embodiment, as a series of instructions (e.g., software program) that reside within computer readable memory units of computer system 600 and executed by a processor(s) of system 600. When executed, the instructions cause computer 600 to perform specific actions and exhibit specific behavior which is described in detail below.

Computer system 600 of FIG. 6 comprises an address/data bus 610 for communicating information, one or more central processors 602 coupled with bus 610 for processing information and instructions. Central processor unit 602 may be a microprocessor or any other type of processor. The computer 600 also includes data storage features such as a computer usable volatile memory unit 604 (e.g., random access memory, static RAM, dynamic RAM, etc.) coupled with bus 610 for storing information and instructions for central processor(s) 602, a computer usable non-volatile memory unit 606 (e.g., read only memory, programmable ROM, flash memory, EPROM, EEPROM, etc.) coupled with bus 610 for storing static information and instructions for processor(s) 602. System 600 also includes one or more signal generating and receiving devices 608 coupled with bus 610 for enabling system 600 to interface with other electronic devices. The communication interface(s) 608 of the present embodiment may include wired and/or wireless communication technology. For example, in one embodiment of the present invention, the communication interface 608 is a serial communication port, but could also alternatively be any of a number of well known communication standards and protocols, e.g., Universal Serial Bus (USB), Ethernet, FireWire (IEEE 1394), parallel, small computer system interface (SCSI), infrared (IR) communication, Bluetooth wireless communication, broadband, and the like.

The system 600 can also include a computer usable mass data storage device 612 such as a magnetic or optical disk and disk drive (e.g., hard drive or floppy diskette) coupled with bus 610 for storing information and instructions. An optional display device 614 is coupled to bus 610 of system 600 for displaying video and/or graphics.

As noted above with reference to exemplary embodiments thereof, the present invention provides a computer system having a kernel for mapping virtual memory address space to physical memory address space. The computer system uses a method for performing an input/output operation. A physical memory buffer is registered with a subsystem, and the physical memory buffer is associated with a first virtual address, a size and a key. The physical memory buffer is dynamically associated with a second virtual address which is different from the first virtual address. As part of an application program an input/output operation is requested regarding the second virtual address. An application table is used to obtain the first virtual address, the key and the size. The first virtual address, the key and the size are supplied to the subsystem. The subsystem uses the first virtual address, the key and the size, to determine the physical memory buffer and performs an input/output operation using the physical memory buffer without intervention of the kernel.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. In a computer system having a kernel providing a mapping between virtual and physical memory address space, a method for performing an input/output operation comprising:
   a) registering a physical memory buffer with a network interface card (NIC), wherein said physical memory buffer is associated with a first virtual address, a size and a key wherein said NIC comprises a memory resident table and wherein said registering comprises storing in said memory resident table an address of said physical memory buffer, said first virtual address, said size and said key;
   b) dynamically associating said physical memory buffer with a second virtual address which is different from said first virtual address;
   c) as part of an application program requesting an input/output operation regarding said second virtual address, using an application table to obtain said first virtual address, said key and said size and supplying said first virtual address, said key and said size to said NIC, wherein the first virtual address and the second virtual address comprise separate and distinct virtual address locations within available virtual address space; and
   d) said NIC, using said first virtual address, said key and said size, to determine the location of said physical memory buffer and performing said input/output operation using said physical memory buffer without intervention of said kernel.

2. The method as described in claim 1 wherein said memory resident table comprises a plurality of entries, each entry comprising: a respective key; a respective size; a respective first virtual address; and a respective physical memory buffer address and, wherein further, said plurality of entries correspond to a plurality of registered physical memory buffers.

3. The method as described in claim 1 wherein said application table comprises a plurality of entries and wherein each entry comprises: a respective offset value; a respective first virtual address; a respective key; and a respective size and, wherein further, said plurality of entries represent a plurality of registered physical memory buffers.

4. The method as described in claim 1 wherein said registering is initiated by said application program.

5. The method as described in claim 4 wherein said registering comprises: a1) said application program supplying said first virtual memory address to said kernel; a2) said kernel determining an address of said physical memory buffer in response to said a1); and a3) said NIC storing said address of said physical memory buffer, said first virtual address, said size and said key into an entry of a memory resident table.

6. The method as described in claim 5 wherein said NIC is a network interface card (NIC) comprising said memory resident table and wherein said registering further comprises said NIC determining said key.

7. The method as described in claim 1 wherein said computer system supports VLM (very large memory) mode and wherein said physical memory address space is larger than virtual memory address space and wherein said b) comprises periodically remapping said virtual memory address space to different portions of said physical memory address space during operation of said computer system.

8. The method as described in claim 7 wherein said periodically remapping is performed by said kernel.

9. A computer system having virtual and physical memory address space and comprising:
   an application program initiating registering of a physical memory buffer with a network interface card (NIC), wherein said physical memory buffer is associated with a first virtual address, a size and a key as a result of said registering wherein said NIC comprises a memory resident table and wherein, as a result of said registering, said memory resident table has stored therein an address of said physical memory buffer, said first virtual address, said size, and said key;
   an operating system kernel dynamically associating said physical memory buffer with a second virtual address which is different from said first virtual address;
   in response to said application program requesting an input/output operation regarding said second virtual address, an application table supplying said first virtual address, said key and said size and said application program supplying said first virtual address, said key and said size to said NIC, wherein the first virtual address and the second virtual address comprise separate and distinct virtual address locations within available virtual address space;

and wherein said NIC uses said first virtual address, said key and said size to determine the location of said physical memory buffer and performing said input/output operation using said physical memory buffer without intervention of said kernel.

10. A computer system as described in claim 9 wherein said memory resident table comprises a plurality of entries, each entry comprising: a respective key; a respective size; a respective first virtual address; and a respective physical memory buffer address and, wherein further, said plurality of entries correspond to a plurality of registered physical memory buffers.

11. The system as described in claim 9 wherein said application table comprises a plurality of entries and wherein each entry comprises: a respective offset value; a respective first virtual address; a respective key; and a respective size and, wherein further, said plurality of entries represent a plurality of registered physical memory buffers.

12. The computer system as described in claim 9 wherein said registering comprises: said application program supplying said first virtual memory address to said kernel; said kernel determining an address of said physical memory buffer in response thereto; and said NIC storing said address of said physical memory buffer, said first virtual address, said size and said key into an entry of a memory resident table.

13. The computer system as described in claim 12 wherein said NIC is a network interface card (NIC) comprising said memory resident table and further wherein said NIC determining said key.

14. The computer system as described in claim 9 wherein said computer system supports VLM (very large memory) mode and wherein said physical memory address space is larger than virtual memory address space and wherein said kernel periodically remaps said virtual memory address space to different portions of said physical memory address space during operation of said computer system.

15. A system comprising:
computer storage readable medium having computer useable code embodied therein for causing a computer to perform a method of initiating an input/output operation comprising:
a) registering a physical memory buffer with a network interface card NIC, wherein said physical memory buffer is associated with a first virtual address, a size and a key wherein said NIC comprises a memory resident table and wherein said registering comprises storing in said memory resident table an address of said physical memory buffer, said first virtual address, said size, and said key;

b) dynamically associating said physical memory buffer with a second virtual address which is different from said first virtual address; and c) as part of an application program requesting an input/output operation regarding said second virtual address, using an application table to obtain said first virtual address, said key and said size and supplying said first virtual address, said key and said size to said NIC, wherein the first virtual address and the second virtual address comprise separate and distinct virtual address locations within available virtual address space and wherein said NIC, using said first virtual address, said key and said size, determining the location of said physical memory buffer and performing said input/output operation using said physical memory buffer without intervention of said kernel.

16. The system as described in claim 15 wherein said memory resident table comprises a plurality of entries, each entry comprising: a respective key; a respective size; a respective first virtual address; and a respective physical memory buffer address and, wherein further, said plurality of entries correspond to a plurality of registered physical memory buffers.

17. The system as described in claim 15 wherein said application table comprises a plurality of entries and wherein each entry comprises: a respective offset value; a respective first virtual address; a respective key; and a respective size and, wherein further, said plurality of entries represent a plurality of registered physical memory buffers.

18. The system as described in claim 15 wherein said registering of said method is initiated by said application program.

19. The system as described in claim 18 wherein said registering of said method comprises: a1) said application program supplying said first virtual memory address to said kernel; a2) said kernel determining an address of said physical memory buffer in response to said a1); and a3) said NIC storing said address of said physical memory buffer, said first virtual address, said size and said key into an entry of a memory resident table.

20. The system as described in claim 19 wherein said NIC is a network interface card (NIC) comprising said memory resident table and wherein said registering of said method further comprises said NIC determining said key.

21. The system as described in claim 15 wherein said computer system supports VLM (very large memory) mode and wherein said physical memory address space is larger than virtual memory address space and wherein said b) of said method comprises periodically remapping said virtual memory address space to different portions of said physical memory address space during operation of said computer system.

22. The system as described in claim 21 wherein said periodically remapping is performed by said kernel.

* * * * *

UNITED STATES PATENT AND TRADEMARK OFFICE
CERTIFICATE OF CORRECTION

PATENT NO. : 7,493,465 B2 Page 1 of 1
APPLICATION NO. : 10/848103
DATED : February 17, 2009
INVENTOR(S) : Susairaj et al.

It is certified that error appears in the above-identified patent and that said Letters Patent is hereby corrected as shown below:

In column 10, line 48, delete "$V_I$," and insert -- $V_I$ --, therefor.

In column 15, line 49, in claim 15, delete "NIC," and insert -- (NIC), --, therefor.

Signed and Sealed this

Eighteenth Day of May, 2010

David J. Kappos
*Director of the United States Patent and Trademark Office*